United States Patent [19]

McDermott

[11] Patent Number: 4,640,403

[45] Date of Patent: Feb. 3, 1987

[54] GRAVITY-CONVEYOR CHUTE SECTION

[76] Inventor: Daniel R. McDermott, 6105 Woodland La., Clinton, Md. 20615

[21] Appl. No.: 701,256

[22] Filed: Feb. 13, 1985

[51] Int. Cl.$^4$ ............................................. E04F 17/12
[52] U.S. Cl. ......................................... 193/34; 232/44
[58] Field of Search ...................... 232/43.1, 43.3, 44, 232/45, 47, 49; 109/19, 66, 73; 193/8, 33, 34, 2 R, 2 A; 220/334, 335

[56] References Cited

U.S. PATENT DOCUMENTS

| | | |
|---|---|---|
| 892,550 | 7/1908 | Ream . |
| 951,602 | 3/1910 | Edwards .............................. 193/34 |
| 1,510,288 | 9/1924 | Malone ................................ 193/34 |
| 1,672,199 | 6/1928 | Brown ................................. 193/34 |
| 1,707,011 | 3/1929 | Heybeck .............................. 193/34 |
| 1,820,262 | 8/1931 | Wilkinson ............................ 193/34 |
| 3,627,090 | 12/1971 | Dickey ................................ 193/34 |
| 4,399,024 | 7/1982 | Wollin ................................ 193/34 |

FOREIGN PATENT DOCUMENTS

| | | | |
|---|---|---|---|
| 527991 | 11/1921 | France ................................. 193/34 |
| 818995 | 4/1981 | U.S.S.R. ............................. 193/33 |

Primary Examiner—Andres Kashnikow
Assistant Examiner—Mary Beth O. Jones
Attorney, Agent, or Firm—Griffin, Branigan, & Butler

[57] ABSTRACT

A rectangularly-shaped debris-conveyor chute section (10) which can be nested with other sections to form a debris chute has a side opening (30) for receiving items to be conveyed by the chute. The side opening (30) has a rotatable door/ledge assembly (32) mounted thereat which can be rotated, as a unit, into the chute opening to bring a ledge thereof flat against a sidewall (22) of the chute section covering the opening (30) or out of the chute opening to bring the ledge perpendicular to the sidewall (22) of the chute and the door over the opening in the sidewall. A baffle (62) is placed on the inside of the sidewall immediately above the side opening to protect the door/ledge assembly (32) from items falling through the chute. Hoisting eyelets (64) are located on the interior of each chute section so that they can be reached through the opening. The conveyor chute sections are mounted inside a building by means of screw jacks (72) attached to the rotatable door/ledge assemblies.

6 Claims, 11 Drawing Figures

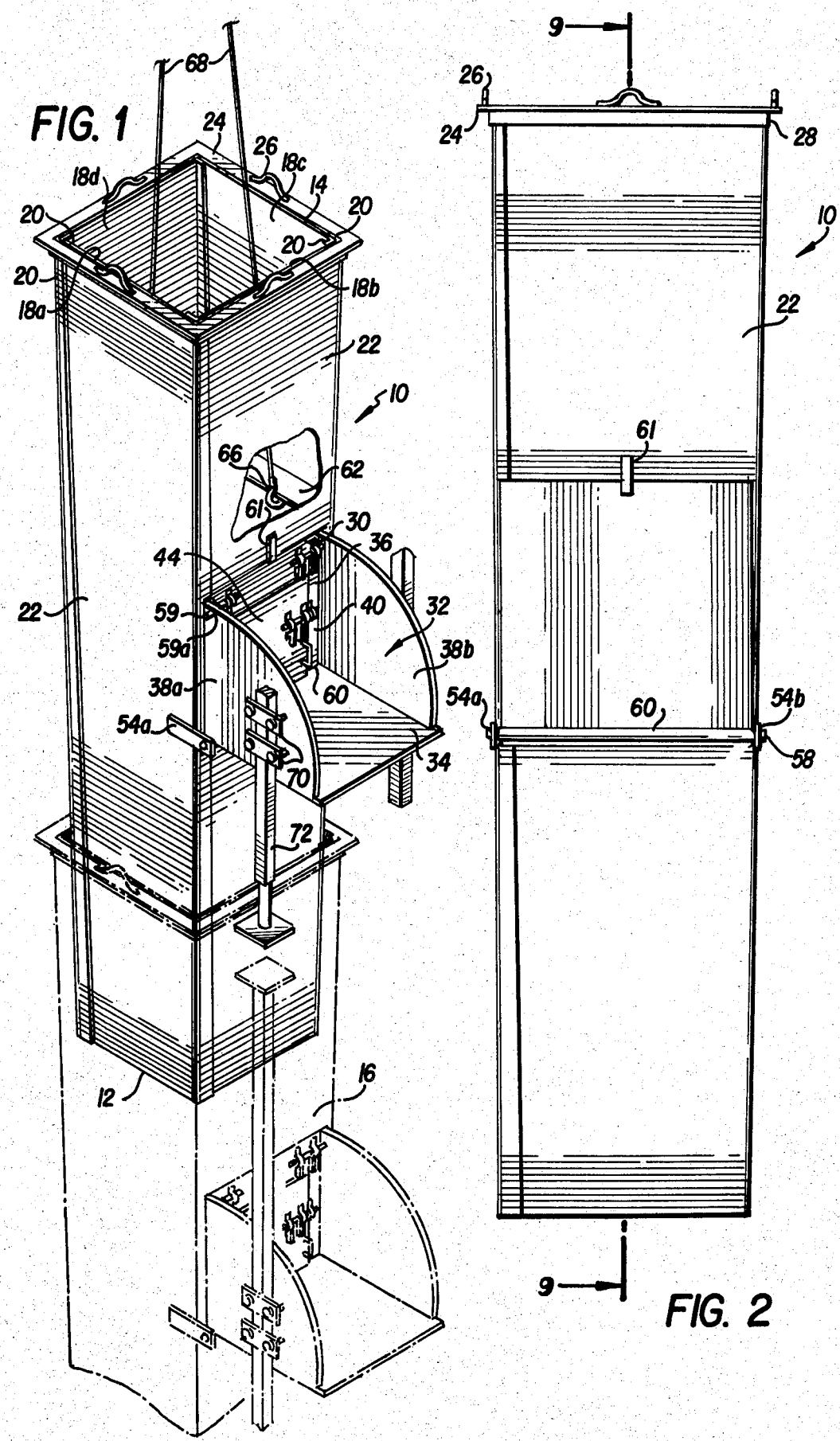

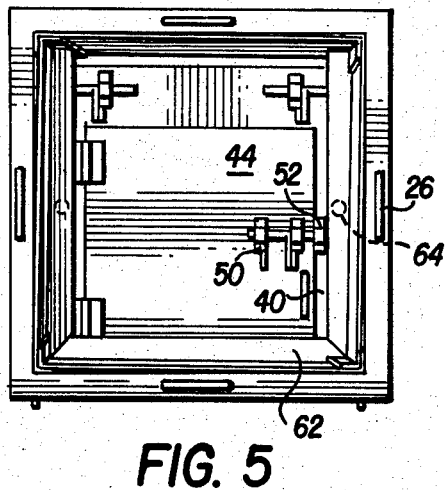
FIG. 5
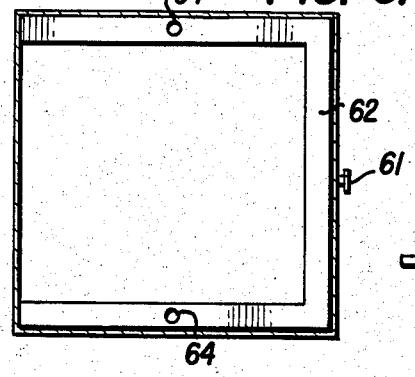
FIG. 6
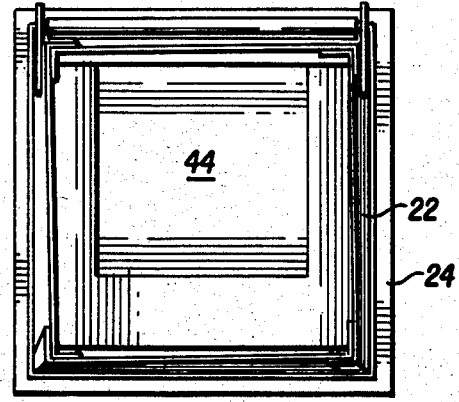
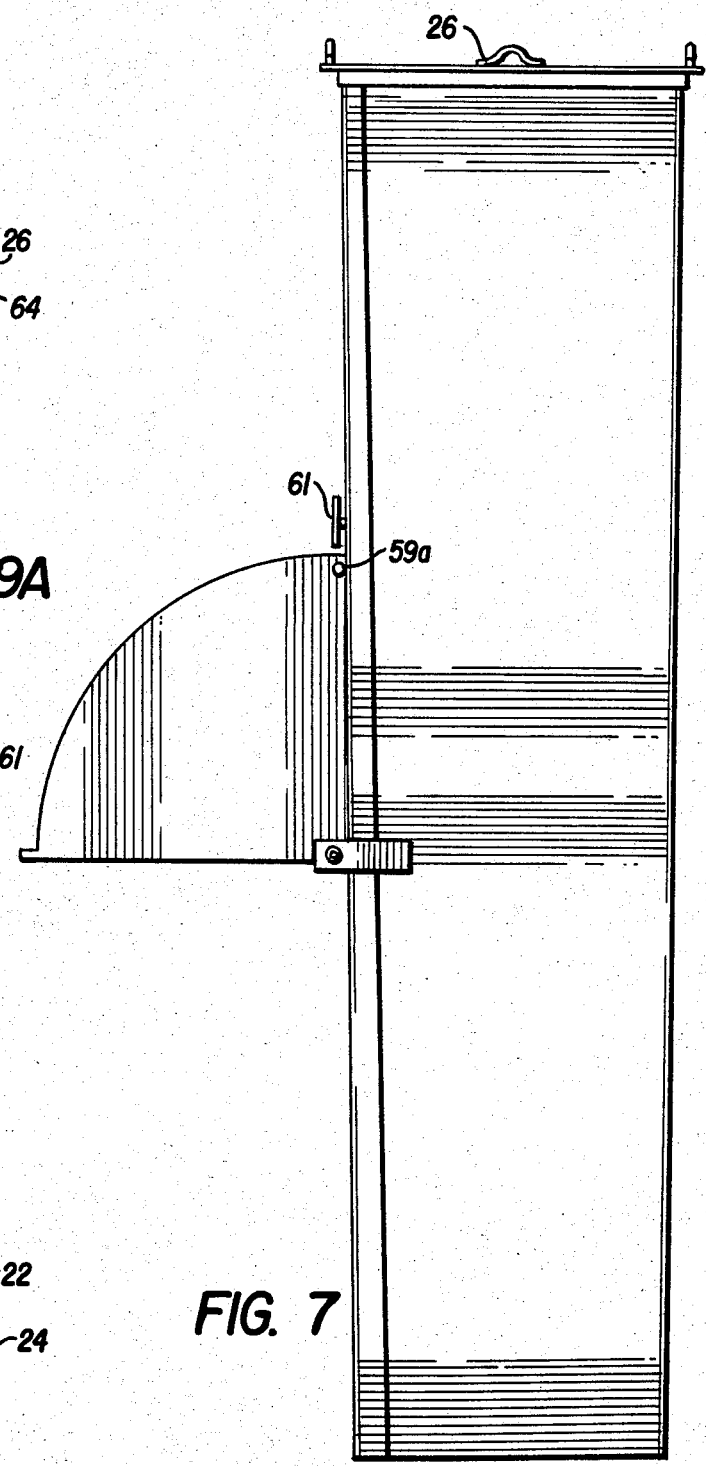
FIG. 9A
FIG. 7

GRAVITY-CONVEYOR CHUTE SECTION

BACKGROUND OF THE INVENTION

This invention relates generally to the art of conveyors, and more particularly to gravity type conveyors, or chutes, which are often used for dropping trash from tall construction sites, such as buildings, in a controlled manner.

Trash, or debris, chutes have long been used by workmen during construction of, or renovation of buildings, and other tall structures, for dropping trash from the structures to the ground in a controlled manner. Usually such chutes are constructed at the work site, often from prefabricated materials. A problem which often arises when prefabricated materials, or chute sections, are employed is that their upstream end openings, when added to lower sections, are often at inconvenient height locations. Thus, it is an object of this invention to provide a prefabricated gravity chute section which has greater flexibility with regard to the location of openings through which trash and other items can be dropped for gravity conveyance therethrough. A related difficulty is that many chutes are constructed such that items can only be dropped into the chutes at the upper ends thereof, however, this is somewhat inconvenient inasmuch as workmen might be working at any number of levels or floors, on a building or other structure and could use the same trash chute if one were available. Thus, it is an object of this invention to provide prefabricated debris chute sections which can be united to form a single gravity chute having a plurality of openings therein through which users can drop items into the chute at various levels along the chute.

A related problem to the problem discussed above is that when many side and other openings are placed in gravity chutes, a safety hazard is thereby created inasmuch as it is difficult to control when and if people will throw things into the chute. If a truck is not positioned below the chute, for example, someone could inadvertently walk under it and be injured by unauthorized trash falling down the chute. Thus, it is an object of this invention to provide gravity conveyor chute sections having openings in the sides thereof, but having lockable doors for the openings so that access to the chute can be selectively controlled for safety as well as other reasons.

It is desirable to utilize prefabricated gravity conveyor chute sections which can be transported easily to and from building sites and can be easily erected and disassembled at the building sites. Also, it is desirable that such chute sections be complete unto themselves, that is, that they do not require the construction of, or supplying of, additional materials at the sites. In this respect, such chutes are normally held in position by braces, cables, and the like constructed adjacent to buildings, but are often outside and spaced from the buildings small distances. Because much debris which is put in the chutes is comprised of small parts, such as small rocks, it is desirable to have ledges leading from the buildings to the chutes so that little or no small materials fall between the chutes and the buildings. Also, ledges aid in sliding large heavy pieces from the buildings to the chutes. Some prior art ledges having been separate members which have had to be lifted and moved into place. Thus, it is yet another object of this invention to provide chute sections having integral ledges, or ramps, which extend from side openings in the chute sections outwardly to structures, such as buildings, but which can be folded into the chutes for ease of transportation. Ledges which have sometimes been used in the past have rested on wall work of the buildings and have therefore interfered with further work around window openings through which the ledges have extended. Further, it is quite difficult and expensive mounting a chute to a building with supports located outside the building. Thus, it is another object of this invention to provide structure and a method for mounting a chute to a building from within the building without resting ledges thereof on wall work of the building.

It is yet another object of this invention to provide gravity chute sections having side openings therein covered by doors.

Further, it is an object of this invention to provide durable chute sections having ramps which are easy and relatively uncomplicated to store and transport and which are inexpensive to construct.

SUMMARY OF THE INVENTION

According to principles of this invention, rectangular conveyor chute sections, of a type which can be nested together to form a rectangularly-shaped conveyor chute, have side openings therein. The side openings are covered by a rotatable door/ledge assembly which can be rotated so that a ledge is perpendicular to a section sidewall and forms a ramp to the opening with the door covering the opening, or can be rotated so that the ledge forms a cover for the opening. A baffle located upstream of the opening deflects items falling through the bore away from the opening in order to protect the door/ledge assembly. Hoisting eyelets are located on the interior of each chute section so that they can be reached by extending an arm through the opening. The conveyor chute sections are mounted to a building inside the building by means of screw jacks attached to the rotatable door/ledge assemblies.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is an isometric view, partially cut away, of a gravity-conveyor chute section shown hoisted to nest in another section illustrated in phantom, along with mounting screw jacks, according to this invention;

FIG. 2 is a front view of the section of FIG. 1 with a door/ledge assembly thereof being rotated so that the ledge is parallel with the section sidewall;

FIG. 5 is a top view of the chute section of FIG. 2;

FIG. 6 is a bottom view of the chute section of FIG. 2;

FIG. 7 is a side view of the chute section of FIG. 1 with the door/ledge assembly being rotated so that the ledge is perpendicular to the sidewall, as in FIG. 1;

FIG. 9A is a simplified sectional view taken on line 9A—9A in FIG. 9; and,

DESCRIPTION OF THE PREFERRED EMBODIMENT

Figure 3:
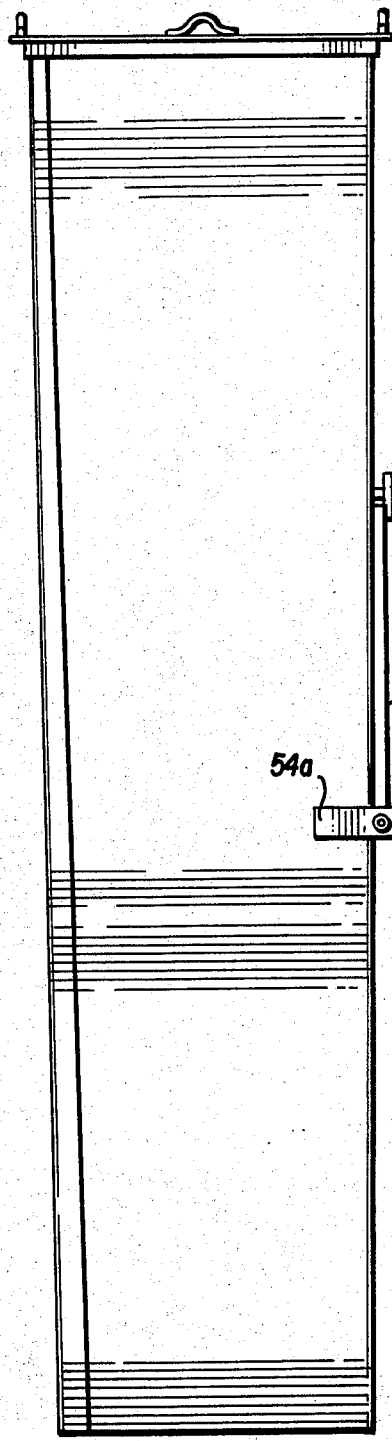
FIG. 3 is a side view of the chute section of FIG. 2.
Figure 4:
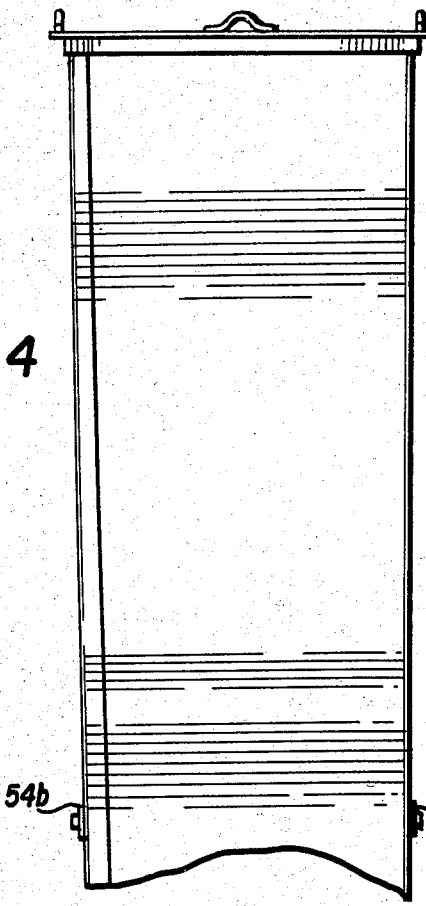
FIG. 4 is a segmented rear view of the chute section of FIG. 2.

Referring now to the drawings, a gravity conveyor chute section 10 is basically a square, or rectangular, tube which has a smaller cross section at its downstream end 12 than at its upstream end 14. The chute section 10 is for use with other identical, chute sections 16 with which its downstream end 12 and its upstream end 14 nest so that the sections can be assembled into a long chute whose length depends on the number of sections used. Inasmuch as the other chute sections 16 are identical with, or similar to, chute section 10, only chute section 10 is described herein, however, it should be understood that some variations in chute sections is also possible within the teachings of this invention.

Section 10 is constructed of four 14 gauge sheets of sheet metal stock 18a-d, each of which has a perpendicular bend 20 at each side edge so that the sheet metal sheets 18a-d can be welded together at their edges to form a rectangular, tubular-shaped, sidewall 22. The section 10 has about its outside at its upstream end 14 a flange 24 on which are mounted handles 26. The flange 24 is welded at the upstream end of the sidewall 22 by means of an L-bend 28. In the preferred embodiment the section is 3 feet by 3 feet square in cross sectional shape.

Figure 9:
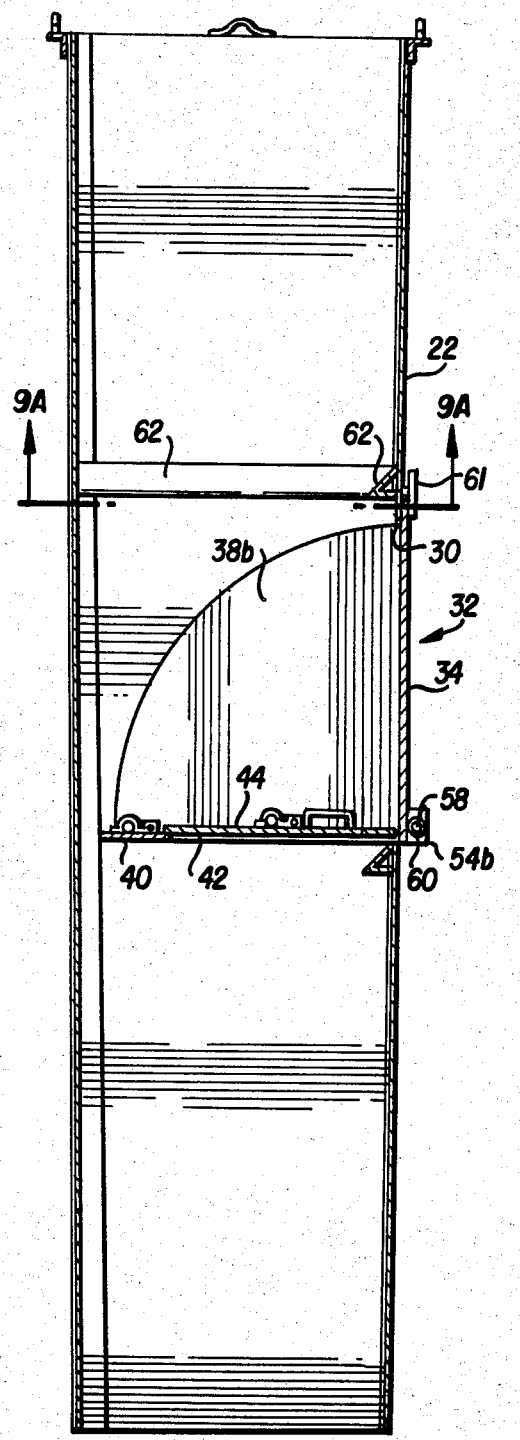
FIG. 9 is a cross-sectional side view of the chute section of FIG. 2 taken along 9—9.

The chute section 10 has a side opening 30 on one side of the square sidewall 22 whereat is rotatably mounted a door/ledge assembly 32. The door/ledge assembly 32 has a quarter pie-piece shape when viewed from the side, with a ledge 34 forming one radial cut of the pie and a door frame assembly 36 forming the other radial cut of the pie. Spaced angle supports 38a and 38b join the ledge 34 and the door frame assembly 36 into a unitary body. The door frame assembly 36 includes a door frame 40 which is fixedly attached to the ledge 34 and the angle supports 38a and 38b and defines a rectangular opening 42 which is covered by a door 44. The door 44 is attached at its left edge to a frame member 46 of the door frame 40 by hinges 48. As can be seen in FIG. 9, the door 44 is larger than the opening 42 in the door frame 40 so that the door 44 overlaps with the door frame 40 and can, therefore, not open inwardly of the frame 30, the door 44 being mounted on the outside of the door frame 40.

A latch 50 is slidably mounted on the door 44 so that it can be slid to engage a catch 52 mounted on the door frame 40 to selectively prevent the door 44 from opening relative to the door frame 40. Keepers 53 are mounted on the door 44, in conjunction with a lever 53a mounted on the latch 50 allows the door 44 to be locked shut or open with a padlock and thereby provides control of use of the conveyor section. A catch 53b mounted on the angle support 38a can also receive the latch 50 for latching the door 44 in an open position.

Figure 8:
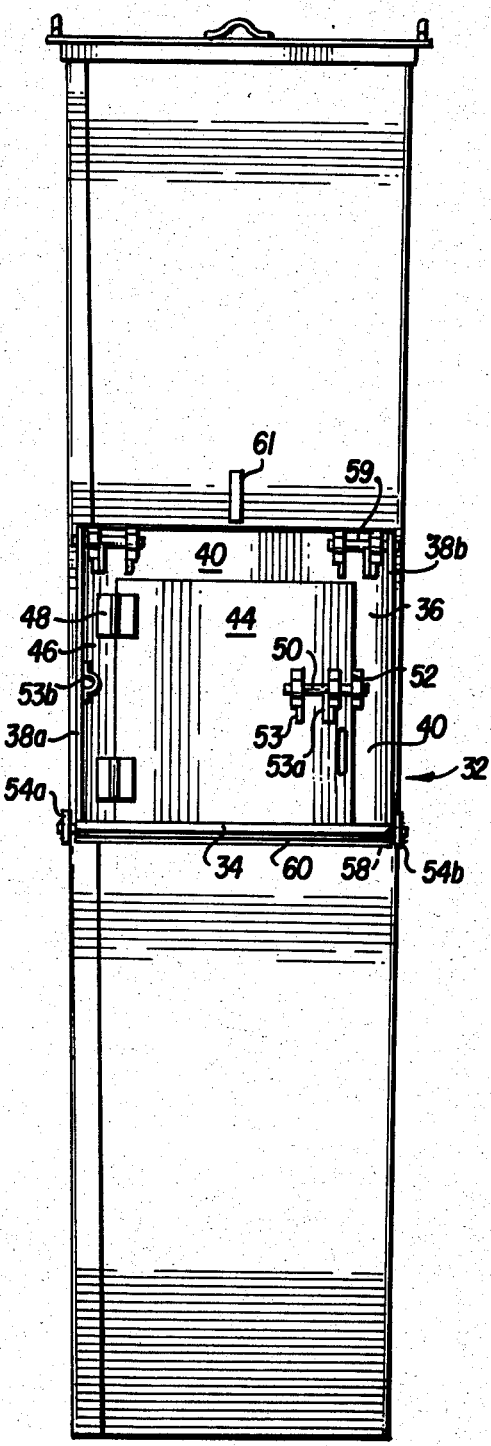
FIG. 8 is a front view of the chute section of FIG. 7.

The entire door/ledge assembly 32 is mounted on one side of the square sidewall 22 by means of stationary hinge supports 54a and 54b which are fixedly welded to a hinge pipe 58 which passes through a pipe 60 attached to the door/ledge assembly 32 at an angle intersection of the ledge 34 and the door frame 40 to allow this assembly to rotate. It can be seen in FIG. 9 that both the ledge 34 and the door frame 40 are approximately the same size (that is, they have the same outer dimensions) and this size is slightly larger than the side opening 30 so that as the door/ledge assembly 32 rotates about the hinge shaft 58, the door frame 40 forms a stop against the inside of the sidewall 22 and the ledge 34 forms a stop against the outside of the sidewall 22. When the ledge 34 is rotated outwardly, away from the sidewall 22, the door frame 40, and the door 44 are approximately in the plane of the sidewall 22 and the ledge 34 is perpendicular with the sidewall 22 so that it serves as a ledge for the opening 30 and the door 44 serves as a cover for the opening 30. On the other hand, when the door frame 40 is rotated into the bore of the chute section 10, as depicted in FIG. 9, the ledge 34 is approximately in the plane of the sidewall 22. Latches 59 are mounted on opposite sides of the upper cross member of door frame 40 for passing through holes 59a in the angle supports 38a and b to contact the sidewalls 22 and thereby hold the door/ledge assembly 32 in an open position as illustrated in FIGS. 1 and 8. A turn bar 61 is mounted on the front sidewall 22 to be rotated for holding the door/ledge assembly 32 in a closed position as illustrated in FIG. 3.

A baffle 62 is mounted on the inside of the front sidewalls 22, extending inwardly therefrom across the top of the side opening 30 so as to deflect any materials falling downwardly through the chute section away from the side opening 30 and any part of the door/ledge assembly 32 which is in the side opening 30. These baffles help to reenforce the chute and help to slow down and brake material in the chute. Further, the baffles protect people at an opening from being injured by trash dropped from above.

The chute section has several structural features which makes it much easier and less expensive to assemble and install on a building than most prior-art chutes. That is, the baffle 62 is reenforced and the sidemembers thereof have holes 64 (FIG. 9A) in the bottoms thereof for receiving hoisting hook 66 (FIG. 1) attached to hoisting lines 68. These attaching points at 64 are extremely helpful in that they can be reached through the opening 42 covered by the door 44, and thus can be reached from within a building rather than by having someone dangerously climb outside a building to release or attach hooks to handles 26.

Figure 10:
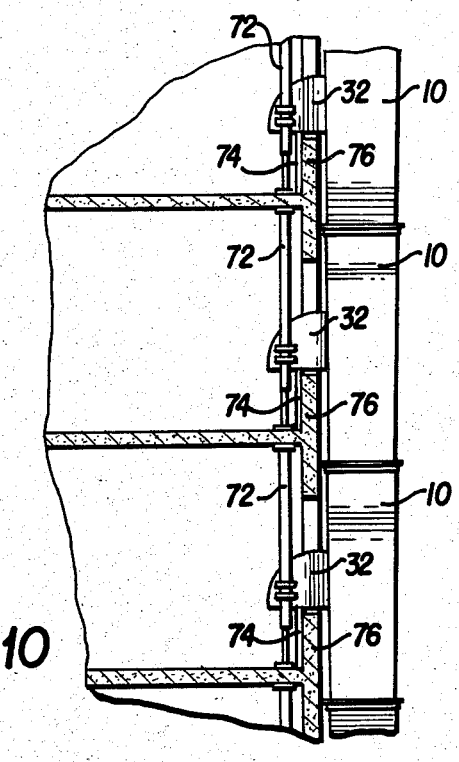
FIG. 10 is a side sectional view of a plurality of conveyor chutes of this invention mounted on the inside of a building by screw jacks.

Another structural feature of the chute section which is extremely helpful in mounting it are clamps 70 which are bolted to the outside surfaces of the door/ledge assembly angle supports 38a and b. These clamps clamp the door/ledge assemblies 32 of the chute sections 10 to screw jacks 72 which are fixed between the floor and ceiling on each floor of a building as is depicted in FIG. 10, one on each side of a door/ledge assembly 32. The screw jacks in conjunction with a wood brace 74 on each floor hold the door/ledge assemblies in fixed positions and the chute sidewall 22 is affixed thereto by the hinge supports 54 and the latches 59. Thus, each chute section 10 is independently mounted from inside the building and does not touch wall work 76 so that preparation of the wall work for receiving windows and the like is not inhibited. Since the chute sections are individually mounted, they can be assembled from the top to the bottom or from the bottom to the top, as is described, and their longitudinal positions can be varied to a large extent.

In operation, a plurality of chute sections 10 are transported to a construction site with the door/ledge assemblies 32 thereof rotated and locked into the bores of the chute sections 10 by turn bars 61, as shown in FIG. 9, so that the ledges 34 thereof are almost in the plane of the sidewalls 22 covering the side openings 30. In this manner, the sections are somewhat streamlined, and the ledges 34 thereof are attached to the sections but yet do not extend outwardly from the sections to make them vulnerable to damage and inconvenient to carry. Once the sections are at the work site they are hoisted into position using hoist lines 68 connected at baffle holes 64 and are assembled adjacent a building from within the building using jack screws and wood braces as is depicted in FIG. 10 to form a gravity-conveyor chute by nesting downstream end 12 of each in the upstream end 14 of the next lower section. In this respect, the sections are lifted into, and held in position while the door/ledge assemblies are opened, locked into position and fastened to the jack screws 72 and supported by wood braces 74. The hoisting lines can then be removed by someone opening the doors 44 and reaching in to remove the hooks 66 from the holes 64. Because each section is independently mounted its longitudinal position can be adjusted within certain limitations, to line up the chute section opening with a building window opening. Again, the chute sections 10 are lifted into position with their side openings 30 facing the direction from which the chute is to receive items to be dropped down the chute. Once a chute section is in position, its door/ledge assembly 32 is rotated outwardly, with the ledge 34 being directed away from the sidewall 22 so that it forms a ledge, or ramp, connecting a building or other structure with the side opening 30 to aid in guiding items to be deposited into the side opening 30 and for preventing debris from falling between the structure and the conveyor. When the door/ledge assembly 32 is locked in this position by the latches 59, the door frame assembly 36 covers the side opening 30, but the door 44 of the door frame assembly 36 can be locked open or closed at any time to control deposits of material into the chute. In this respect, the selectively lockable door 44 serves as a safeguard against injuries in that it is more difficult for one to inadvertently put something into the chute when there is someone standing under it at the bottom. Also, it prevents an unauthorized person from putting something in the chute which might damage the chute. The baffle 62 deflects any items falling through the chute secton 22 outwardly away from the door frame assembly 36 to thereby protect the frame 40, the door 44, and the hinges 48 connecting these members.

By having a structure which allows workmen to install a chute from inside a building the chute sections of this invention and the method by which they are installed provide safety over related prior-art devices and methods. Plus, by not using the wall work of a building for supporting the chute, further preparation of the wall work is not prevented.

It can be appreciated by those skilled in the art that one could utilize a chute section 10 having a side opening 30 and door/ledge assembly 32 with other sections which do not have such a side opening and door/ledge assembly. The sections could be made to be approximately one building story long, and, in this respect, various length sections could be produced and sold to correspond to standard building floor dimensions.

The embodiments of the invention in which an exclusive property or privilege is claimed are defined as follows:

1. A portable gravity conveyor chute section of a type which can be nested with other conveyor chute sections to form a gravity conveyor chute, the section comprising a sidewall having basically a tubular shape which guides items falling through a bore thereof, said section having an upstream end opening for receiving items dropped into said section from above, and a downstream end opening for discharging said items passing through the bore of said section, said downstream end being selectively engagable with the upstream end of an adjacent section to form said conveyor chute to be longer than a single section whereby items serially fall through the bores of said thusly engaged sections, said section further defining a side opening through the sidewall thereof at a position intermediate said upstream and downstream ends through which items can be dropped into the bore of said section, said section including a unitary door/ledge assembly mounted at said side opening, said door/ledge assembly comprising a door frame and a ledge member being fixedly attached together, and a hinge to hingedly attach said unitary door/ledge assembly at an edge of said side opening for allowing said door frame to be rotated inwardly into the bore of said chute section, thereby making the outside shape of said chute section more streamline, and to be rotated outwardly, thereby closing said door frame on the inside of the side opening with said ledge member extending away from said sidewall, and wherein is further included a door mounted on said door frame, whereby said door/ledge assembly forms a ledge and door for said side opening when it is rotated outwardly said door including latching means for selectively preventing said door from opening.

2. A portable gravity conveyor chute section as in claim 1, wherein is further included a baffle mounted on the inside of said sidewall above said opening to deflect items passing through said bore away from said side opening.

3. A portable gravity conveyor chute section as in claim 1, wherein is further included a locking means on said door for locking said door to said door frame.

4. A portable gravity conveyor chute section section as in claim 1, wherein said gravity conveyor chute section has a rectangular cross-sectional shape.

5. A portable gravity conveyor chute section of a type which can be nested with other conveyor chute sections to form a gravity conveyor chute mounted on the outsides of buildings, the section comprising a sidewall having basically a tubular shape which guides items falling through a bore thereof, said section having an upstream end opening for receiving items dropped into said section from above, and a downstream end opening for discharging said items passing through the bore of said section, said downstream end being selectively engagable with the upstream end of an adjacent section to form said conveyor chute to be longer than a single section whereby items serially fall through the bores of said thusly engaged sections, said section further defining a side opening through the sidewall thereof at a position intermediate said upstream and downstream ends through which items can be dropped into the bore of said section, said section including a door covering said side opening and being hingedly attached to said sidewall, said door including latching means for selectively preventing said door from opening; said conveyor chute section further including a baffle means positioned on and attached to the inside surface of said section adjacent said side opening said baffle means including an inwardly, downwardly sloping surface to deflect items falling through said section inwardly and including a tie means for receiving a hoisting line hook of a hoisting device for lifting said section, said tie means being accessible to someone outside said section reaching through said side opening, whereby, said portable section can be positioned on the outside of a building with said side opening facing said building, a hoisting device for lifting and manipulating said section can be made to extend a hoisting line having a hook on the end thereof through said upstream end opening of said conveyor chute section for positioning said hook near said side opening and someone from within said building can reach through said side opening and engage or disengage said hoisting line hook from said tie means without getting outside said building and said section.

6. A portable gravity conveyor chute section of a type which can be nested with other conveyor chute sections to form a gravity conveyor chute mounted on the outsides of buildings, the section comprising a sidewall having basically a tubular shape which guides items falling through a bore thereof, said section having an upstream end opening for receiving items dropped into said section from above, and a downstream end opening for discharging said items passing through the bore of said section, said downstream end being selectively engagable with the upstream end of an adjacent section to form said conveyor chute to be longer than a single section whereby items serially fall through the bores of said thusly engaged sections, said section further defining a side opening through the sidewall thereof at a position intermediate said upstream and downstream ends through which items can be dropped into the bore of said section, said section including a door covering said side opening and being hingedly attached to said sidewall, said door including latching means for selectively preventing said door from opening; said conveyor chute section further including a baffle means positioned on and attached to the inside surface of said section, said baffle means including an inwardly, downwardly sloping surface to deflect items falling through said section inwardly and a tie means positioned on and contacting the inside surface of said section adjacent said side opening, downstream of said baffle means, for receiving a hoisting line hook of a hoising device for lifting said section, said baffle means preventing falling items from contacting said tie means, said tie means being accessible to someone outside said section reaching through said side opening, whereby, said portable section can be positioned on the outside of a building with said side opening facing said building, a hoisting device for lifting and manipulating said section can be made to extend a hoisting line having a hook on the end thereof through said upstream end opening of said conveyor chute section for positioning said hook near said side opening and someone from within said building can reach through said side opening and engage or disengage said hoisting line hook from said tie means without getting outside said building and said section.

* * * * *